(12) United States Patent
Choi et al.

(10) Patent No.: US 11,414,183 B2
(45) Date of Patent: Aug. 16, 2022

(54) COMPOUND HELICOPTER HAVING A TILTABLE JET ENGINE

(71) Applicant: Bell Textron Inc., Fort Worth, TX (US)

(72) Inventors: Jouyoung Jason Choi, Southlake, TX (US); Carlos Alexandra Fenny, Fort Worth, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 245 days.

(21) Appl. No.: 16/541,068

(22) Filed: Aug. 14, 2019

(65) Prior Publication Data

US 2021/0047028 A1 Feb. 18, 2021

(51) Int. Cl.
*B64C 27/26* (2006.01)
*B64C 27/82* (2006.01)
*B64D 27/16* (2006.01)
*B64C 27/06* (2006.01)

(52) U.S. Cl.
CPC .............. *B64C 27/26* (2013.01); *B64C 27/06* (2013.01); *B64C 27/82* (2013.01); *B64D 27/16* (2013.01); *B64C 2027/8263* (2013.01)

(58) Field of Classification Search
CPC ............... B64C 29/0075; B64C 2027/8218
See application file for complete search history.

(56) References Cited

U.S. PATENT DOCUMENTS

| | | | | |
|---|---|---|---|---|
| 3,797,783 A * | 3/1974 | Kisovec | ............. | B64C 29/0033 |
| | | | | 244/7 A |
| 4,589,611 A * | 5/1986 | Ramme | ................... | B64C 27/10 |
| | | | | 244/12.3 |
| 4,928,907 A * | 5/1990 | Zuck | ....................... | B64C 27/26 |
| | | | | 244/48 |
| 6,340,133 B1 * | 1/2002 | Capanna | ............. | B64C 29/0083 |
| | | | | 244/12.3 |
| 6,471,158 B1 * | 10/2002 | Davis | ...................... | B64C 27/02 |
| | | | | 244/8 |
| 10,562,618 B2 * | 2/2020 | Robertson | ................. | B64C 9/04 |
| 10,889,366 B2 * | 1/2021 | Jarrett | ..................... | B64C 27/26 |
| 2002/0088898 A1 * | 7/2002 | Lucy | ........................ | B64D 1/16 |
| | | | | 244/17.11 |

\* cited by examiner

*Primary Examiner* — Brian M O'Hara
(74) *Attorney, Agent, or Firm* — Pramudji Law Group PLLC; Ari Pramudji

(57) ABSTRACT

In an implementation, the compound helicopter may include at least one rotary wing system, at least one first power generator and at least one second power generator. The at least one first power generator may rotate the at least one rotary wing blade to provide lift and a primary thrust force in a first direction to the helicopter. The at least one second power generator may be connected to the helicopter and may provide lift and a secondary thrust force in a direction that is independent of a direction of the primary thrust force and may also provide a secondary thrust force in a direction that is substantially parallel to the primary thrust force.

19 Claims, 11 Drawing Sheets

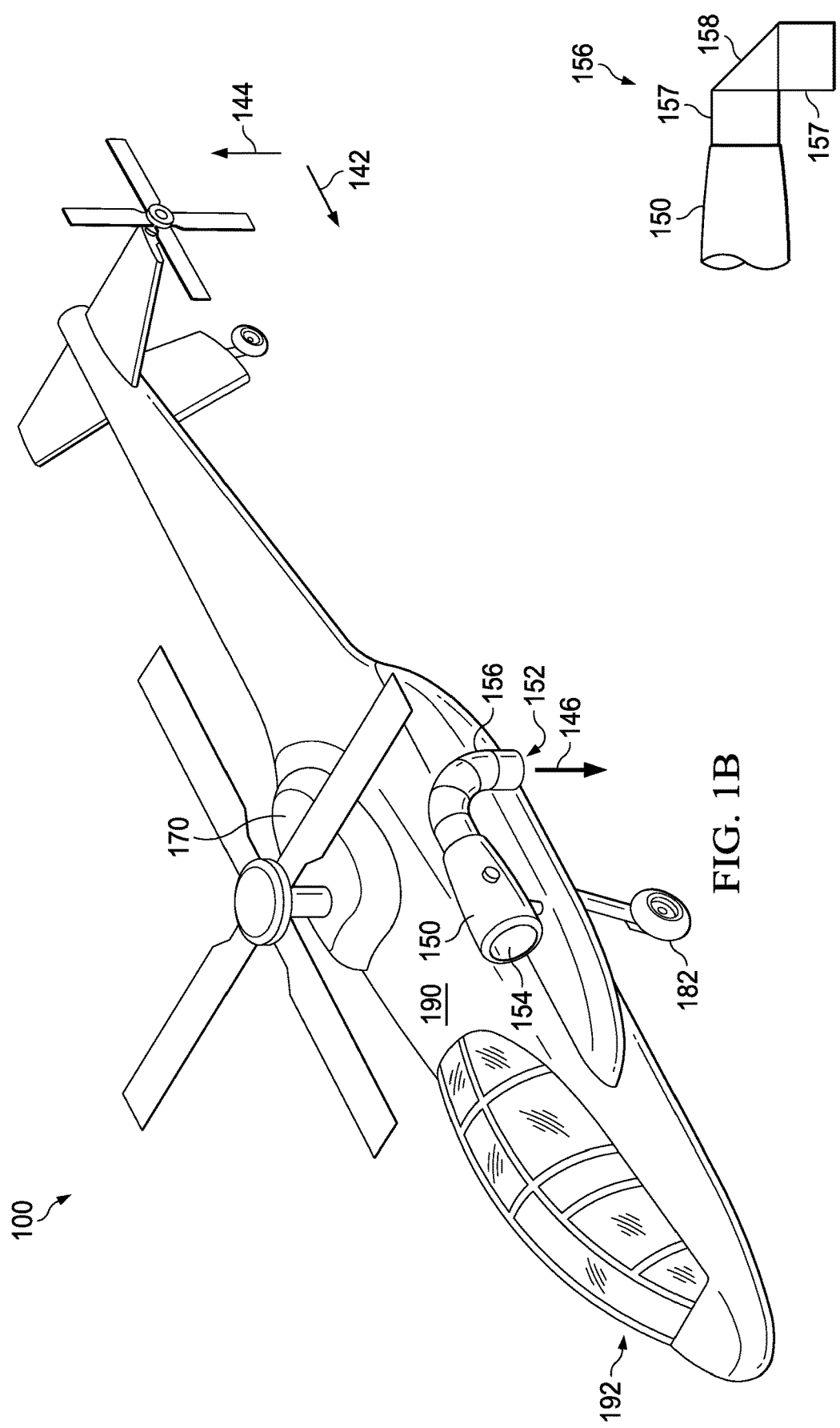

COMPOUND HELICOPTER HAVING A TILTABLE JET ENGINE

STATEMENT REGARDING FEDERALLY SPONSORED RESEARCH OR DEVELOPMENT

Not applicable.

BACKGROUND

This section is intended to provide background information to facilitate an understanding of various technologies described herein. It should be understood that the statements in this section are not to be read as admissions of prior art.

A compound helicopter is a helicopter having an auxiliary propulsion system, which provides thrust in excess of that which a main rotor alone can produce. Thus, an increase in forward speeds is provided with the addition of the auxiliary propulsion system. Some auxiliary propulsion systems have included linear jet engines. However, such linear jet engines may present too large of a load on fuel consumption to be efficiently used as an auxiliary propulsion system.

SUMMARY

Briefly, particular implementations of claimed subject matter may relate to a compound helicopter having a tiltable jet engine.

In an implementation, the compound helicopter may include at least one rotary wing system (alternatively referred to hereinafter as "rotary wing assembly"), which may include blades, a hub and blade pitch control systems, at least one first power generator and at least one second power generator. The at least one first power generator may rotate the at least one rotary wing system to provide lift and a primary thrust force in a first direction to the helicopter. The at least one second power generator may be connected to the helicopter and may provide lift and a secondary thrust force in a direction that is independent of a direction of the primary thrust force and may also provide a secondary thrust force in a direction that is substantially parallel to the primary thrust force. The second power generator may be tiltable/rotatable and may be a jet engine such as a turbofan jet, a turboprop, an axial jet, etc. The second power generator may generate power in a fourth direction, which may be any degree of three-hundred and sixty degrees about at least one axis during transition from the first direction to the second direction. An engine arrangement may include at least two second power sources on opposite sides of the fuselage.

The compound helicopter may include a fuselage and at least one secondary wing that is connected to the fuselage. The secondary wing may include a proximal end region that connects the secondary wing to the fuselage. The secondary wing may include a distal end region opposite of the proximal end region. The second power generator may be attached to the distal end region of the secondary wing. The secondary wing may be tiltable/rotatable about any and all of the three axes of rotation; and/or the second power generator, which may be attached to the secondary wing, may be tiltable/rotatable about any and all of the three axes of rotation.

The compound helicopter may include a tail boom aft of the rotor assembly. A proximal end region of the tail boom may be connected to the fuselage of the helicopter, e.g., it may be connected to a passenger compartment of the helicopter. The tail boom may extend from the fuselage of the compound helicopter and may have a distal end region aft of the proximal end region. A tail rotor may be at the distal end region of the helicopter.

In another implementation, the compound helicopter may include a fuselage, an empennage, one or more wings, a main rotor assembly and one or more second power generators. The empennage and the one or more wings may be connected to the fuselage. The main rotor assembly may have a first power generator, which may be configured to rotate at least one rotary wing and generate thrust in a first direction. The one or more second power generators may be coupled to any of the fuselage, the empennage or the one or more wings. The one or more second power generators may be configured to generate thrust in the first direction.

An engine arrangement may include at least two second power sources on opposite sides of the fuselage. The engine arrangement may be connected to the helicopter and may provide a lifting thrust force and a secondary thrust force in a second direction that is independent of the first direction and may also provide a secondary thrust force in a direction that is substantially parallel to the primary thrust force. The engine arrangement may balance the force of torque from the primary power source by providing a balancing torque.

In a further implementation, a method of providing lift and thrust to a compound helicopter may include providing a first lift force to a helicopter by rotating a rotary wing via a first power generator, providing a second lift force to the compound helicopter by operating a jet engine that is attached to the helicopter, providing a first thrust force to the compound helicopter by tilting the rotary wing and providing a second thrust force to the compound helicopter by tilting the jet engine.

The second power generator may be a jet engine that is a turbofan jet, a turboprop jet, an axial jet, etc. The method may include tilting or rotating the second power generator between multiple positions. The method may further include determining a first amount of torque exerted on the helicopter by the first power generator and balancing the first amount of torque exerted on the helicopter by providing a second amount of torque from the at least one second power source.

BRIEF DESCRIPTION OF THE DRAWINGS

The present technique(s) will be described further, by way of example, with reference to implementations thereof as illustrated in the accompanying drawings. It should be understood, however, that the accompanying drawings illustrate only the various implementations described herein and are not meant to limit the scope of various techniques, methods, systems, or apparatuses described herein.

FIG. 1B illustrates the rotary wing aircraft of FIG. 1A having the secondary engine arrangement in a second configuration;

FIG. 1C illustrates a flexible outlet tube for the secondary engine arrangement of FIG. 1A;

DETAILED DESCRIPTION

Figure 1A:
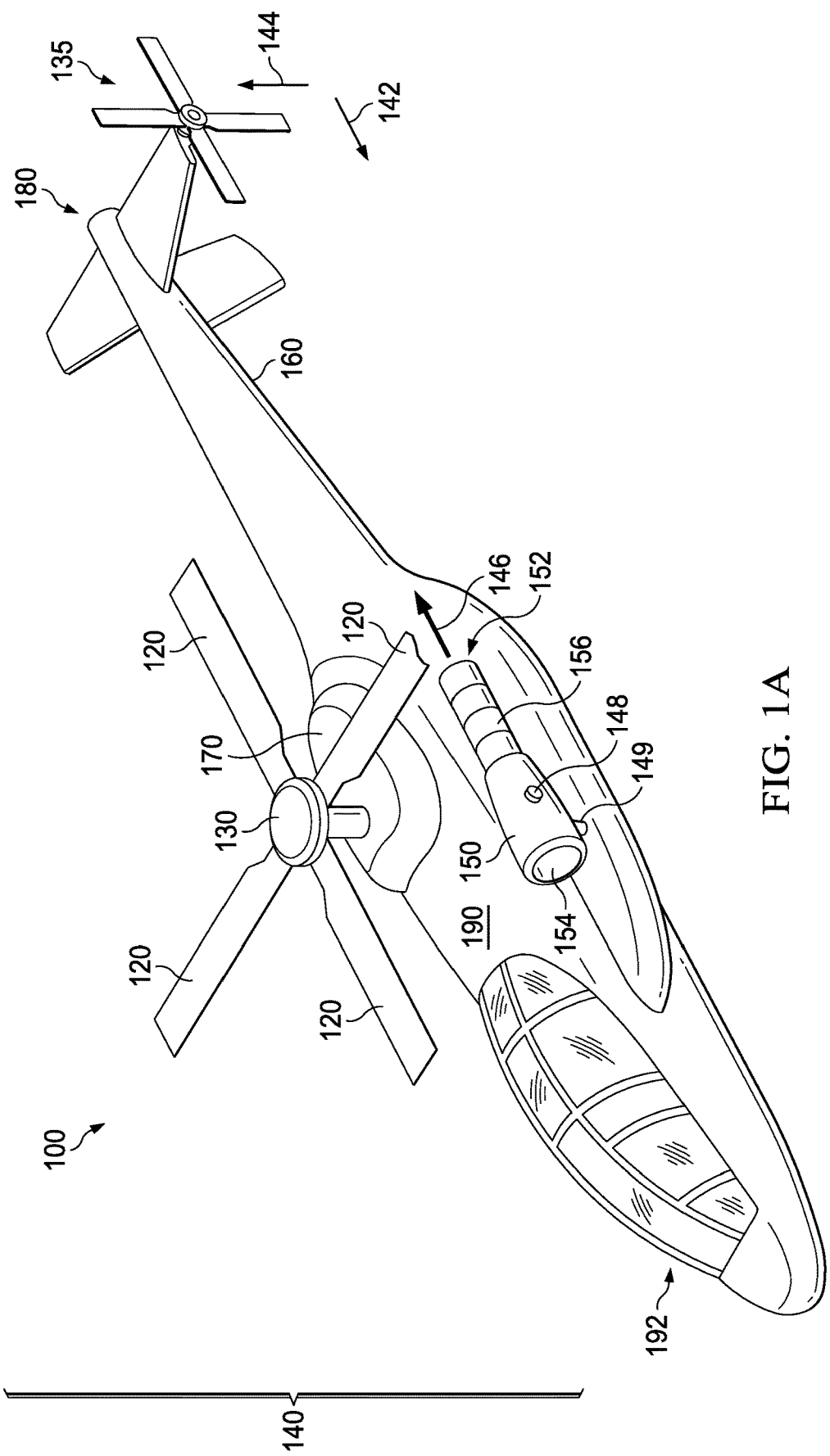
FIG. 1A illustrates an implementation of rotary wing aircraft having a secondary engine arrangement in a first configuration.

A conventional helicopter has its main rotor above a fuselage, just aft of the cockpit area. The main rotor includes two or more rotor blades extending out from a central rotor head (hub) assembly.

Each rotor blade has an airfoil profile similar to that of an airplane wing, and as the blades rotate through the air they may generate lift much the same way as an airplane wing does. A propulsion force, e.g., a force emanating from, for example, the rotary blades or a jet engine, propelling the aircraft in a particular direction, may be referred to hereinafter as a "thrust" or a "thrust force." Thrust as used herein may also be used to refer to reaction of an aircraft in response to a propulsion force.

A tail rotor may be at the very rear of the helicopter's tail boom. A tail rotor is a vertically mounted rotor consisting of two or more blades, similar to an airplane propeller. This tail rotor may be used to control the yaw, or rotation, of the helicopter (e.g. which way the nose is pointing) and can accommodate torque resulting from the main rotor.

Torque is a natural reactive moment caused by any turning object. In a helicopter, torque can be caused by turning the main rotor blades. For instance, when the main rotor is spinning, the natural reaction is for the fuselage of the helicopter to start spinning in the opposite direction to the main rotor. If this torque is not controlled, the helicopter would spin out of control. To accommodate torque, the tail rotor can be implemented through connection of gears and a shaft to the main rotor such that the tail rotor turns whenever the main rotor is spinning.

An alternative method of yaw control on some helicopters, instead of using a tail rotor, is causing redirection of downwash from the main rotor and expelling low pressure air from the tail boom taking advantage of the Coandă effect, which is the tendency of a fluid to adhere to a convex surface. Thus, in some helicopters, instead of a tail rotor to generate sideways thrust, the tail rotor may be omitted owing to the Coandă effect.

Example implementations allow for thrust from a jet engine to be used for propulsion of compound helicopters. In certain aspects, the jet engine thrust may provide thrust in a particular flight mode (forward-flight, hover, transition). For instance, in hover-mode, by directing jet engine thrust downward, additional thrust from a second jet engine may allow for smaller main rotor size; thus, improving cruise (forward-flight) efficiency through the reduction of drag from the main rotor. Additionally, downward jet engine thrust can also compensate for the weight penalty associated by adding a second power generator, as well as provide a lower center-of-gravity to the compound helicopter.

Particular implementations of claimed subject matter will now be described with reference to the figures, such as FIG. 1, which shows a representative aircraft 100. Although representative aircraft 100 shows a rotary-wing aircraft (e.g., a rotorcraft/helicopter) having retractable landing gear, implementations of claimed subject matter are not limited to applications of such aircraft types. Rather, claimed subject matter is intended to embrace a variety of aircraft environments, such as commercial or military aircraft utilizing one or more fixed wings, tiltrotor aircraft, commercial and military helicopters, and so forth. Additionally, although the representative aircraft 100 is shown to include four rotary wing blades 120, implementations of claimed subject matter may be applied to a mast 130 of a rotary wing aircraft and inclusive of any number of rotary wing blades 120, such as helicopters or tiltrotor aircrafts including two blades, three blades, five blades, and so forth, virtually without limitation.

The aircraft 100 may be a compound helicopter. As illustrated in FIG. 1A, the aircraft 100 may include at least one tail rotor assembly 135 and at least one main rotor assembly 140 that includes the rotary wing blades 120 and the mast 130. The aircraft 100 may include an external engine 150 such as a secondary power source, jet engine (e.g., turbofan jet) on either or both sides of the aircraft 100 and may also include a tail boom 160 aft of the main rotor assembly 140.

The main rotor assembly 140 may include a primary power source 170 (symbolically illustrated as element 170). For example, the primary power source 170 may be a gasoline engine, an electric motor, a turbine engine, etc. The primary power source 170 may provide power to provide rotational motion to the main rotor assembly 140. In some implementations, the primary power source 170 may provide power to the tail rotor assembly 135, which may be included at a distal end region 180 of the tail boom 160. In other implementations, the tail rotor assembly 135 may be powered independently from the primary power source 170. While certain figures illustrate that the tail rotor 135 may be on an end of a horizontal stabilizer, in other implementations, the tail rotor 135 may be coupled at various other positions on the tail boom for use in either hover-mode or forward flight. Moreover, in some cases, the tail rotor itself may be incorporated with a ducted fan, shrouded fan or a swiveling-actuator design.

The secondary power source 150 may be fixed to a fuselage 190 of the aircraft 100. The secondary power source 150 may be fixed at any position on the aircraft 100. There may be at least two secondary power sources fixed to the aircraft 100, e.g., a pair of secondary power sources. The pair of secondary power sources may be fixed to the aircraft 100 on opposing sides of the aircraft 100. The pair of secondary power sources may be a power source arrangement.

The secondary power source 150 (e.g., both of the pair of secondary power sources in a power source arrangement) may be a jet engine. For example, the jet engine may be a turbofan jet.

With reference to FIG. 1B, the aircraft 100 may include retractable landing gear 182. The retractable landing gear 182 may be stowed in the fuselage 190 to reduce drag during forward flight.

As illustrated in FIG. 1B, the secondary power source 150 may include a thrust outlet 152 and an air inlet 154. The thrust outlet 152 may be at an end region of a flexible tube 156. The flexible tube 156 may be repositioned (e.g., tilted, rotated) from a position as illustrated in FIG. 1A to the position illustrated in FIG. 1B. For example, FIG. 1A illustrates that the flexible tube 156 may be positioned such that air, e.g., exhaust, emitted from the thrust outlet 152, may be substantially parallel (e.g., substantially in an opposing direction) with a forward direction 142, e.g., an X-direction, of the helicopter 100. FIG. 1B illustrates that the thrust outlet may be positioned (e.g., tilted, rotated) such that air, e.g., exhaust, emitted from the thrust outlet 152 may be in a substantially perpendicular direction 144, e.g., a Y-direction, to the forward direction 142 of the helicopter. The perpendicular direction 144 may be approximately ninety degrees from the forward direction 142. Advantageously, such a configuration of the thrust outlet 152 illustrated in FIG. 1A provides extra thrust (e.g., backward jet-engine thrust, propulsion in forward flight) when the helicopter is moving forward (e.g., in forward-flight mode, cruise) and parallel to the ground. The configuration of the thrust outlet 152 illustrated in FIG. 1B provides vertical thrust (e.g., downward jet-engine thrust) substantially coplanar to the primary thrust force of the rotary wing blades 120, hence aiding the lifting efforts.

A transitional thrust may be provided by the secondary power source 150. Transitional thrust may be a direction of thrust at any point between thrust in the forward direction 142 and thrust in the perpendicular direction 144, e.g., vertical. For example, during rotation between the forward direction 142 and the perpendicular direction 144, the secondary power source 150 may be positioned in a fixed place. The secondary power source is not limited to providing thrust in the forward direction 142 and in the perpendicular direction 144 but may provide thrust at any point therebetween. Thus, as a further advantage, while in hover-mode, the secondary power source may assist both lift and thrust actions (e.g., enabling additional downward jet-engine thrust) of the primary power source.

While in forward-flight, the secondary power source may also provide thrust in the rearward direction to provide propulsion (e.g., backward jet-engine thrust enabling transition to higher speeds). The rearward direction may be a direction one hundred and eighty degrees from the forward direction 142. Thus, the secondary power source 150 may be capable of rotating at least two hundred and seventy degrees between the rearward direction and the perpendicular direction 144.

The flexible tube 156 may be controlled from a cockpit 192 of the helicopter. Bending of the flexible tube 156 may be executed using one or more of a variety of exclusively different ways. For example, a wire assembly may be used to control the flexible tube 156. A first wire may be on a dorsal side, e.g., upper side, of the flexible tube and a second wire may be attached on an anterior side, e.g., front side, of the flexible tube 156. Tertiary tubes may be attached to the sides of the flexible tube 156. The wire(s) (or any other type of control rod or line) may be connected at one end to a servo motor and may be connected at a second end to the thrust outlet end of the flexible tube 156.

FIG. 1C illustrates a section of an alternative embodiment of the flexible tube 156. The flexible tube 156 may include a combined tube 158 (e.g., an elbow tube joint) that both may rotate circumferentially relative to each other. Rotation of the elbow joint 158 may reconfigure the flexible tube 156 from a zero degree angle, e.g., parallel with a direction of travel of the helicopter, to a ninety degree angle, e.g., vertical to a direction of travel of the helicopter 100.

Figure 2A:
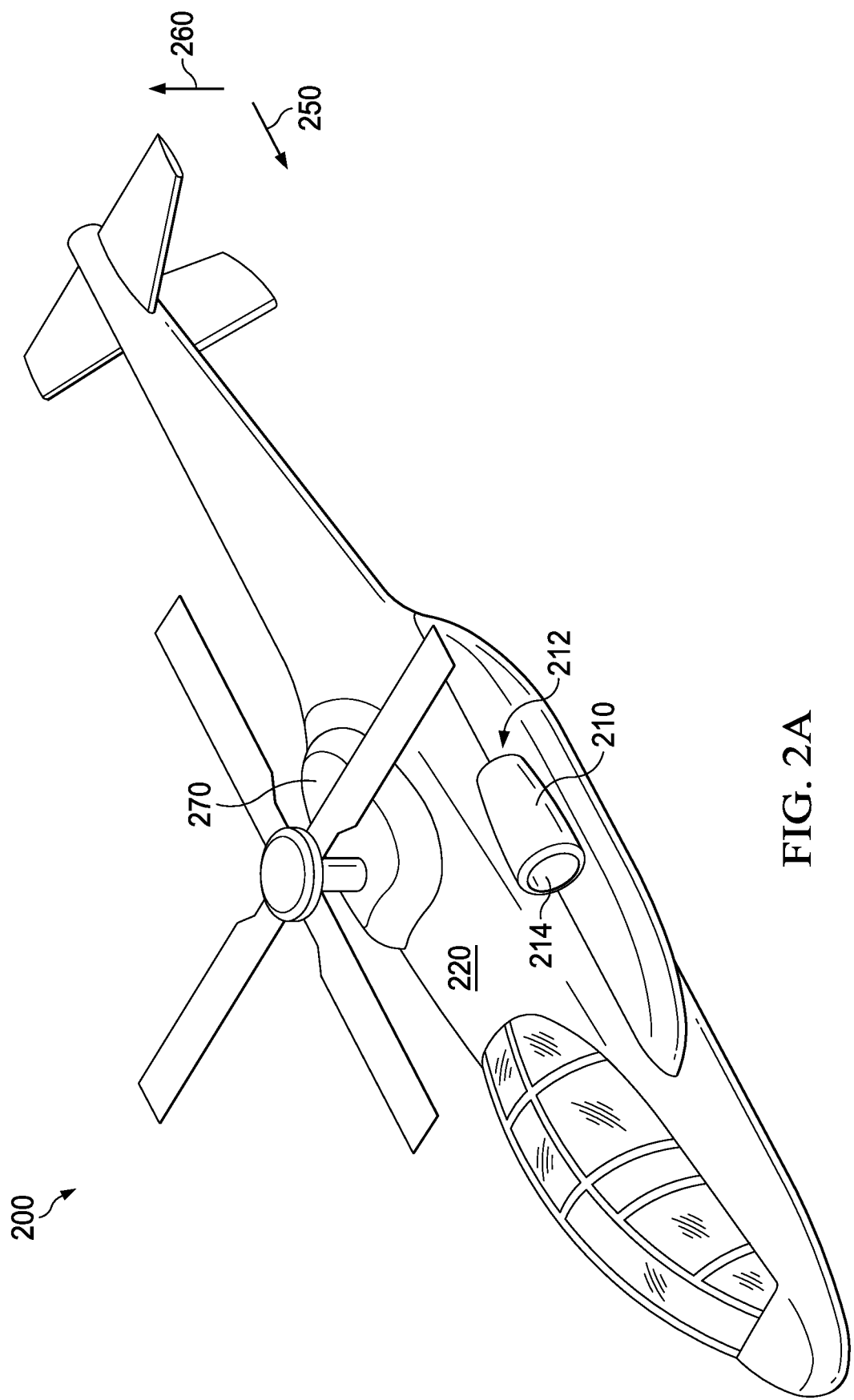
FIG. 2A illustrates a further implementation of a rotary wing aircraft having a secondary engine arrangement in a first configuration.

FIG. 2A illustrates another implementation of an aircraft 200. Similarly illustrated features from the previous implementation are applicable to the present implementation and will not be discussed here.

The aircraft 200 may be a compound helicopter, using the Coandă effect, thereby not in need of a tail rotor. The aircraft 200 may include a secondary power source 210, e.g., a secondary power source, jet engine (e.g., turbofan jet). The secondary power source 210 may be fixed to a fuselage 220 of the aircraft 200. The secondary power source 210 may be fixed at any position on the aircraft 200. There may be at least two secondary power sources fixed to the aircraft 200, e.g., a pair of secondary power sources. The pair of secondary power sources may be fixed to the aircraft 200 on opposing sides of the aircraft 200. The pair of secondary power sources may be a power source arrangement.

The secondary power source 210 (e.g., both of the pair of secondary power sources in a power source pair) may be a jet engine. For example, the jet engine may be a turbofan jet.

Figure 2B:
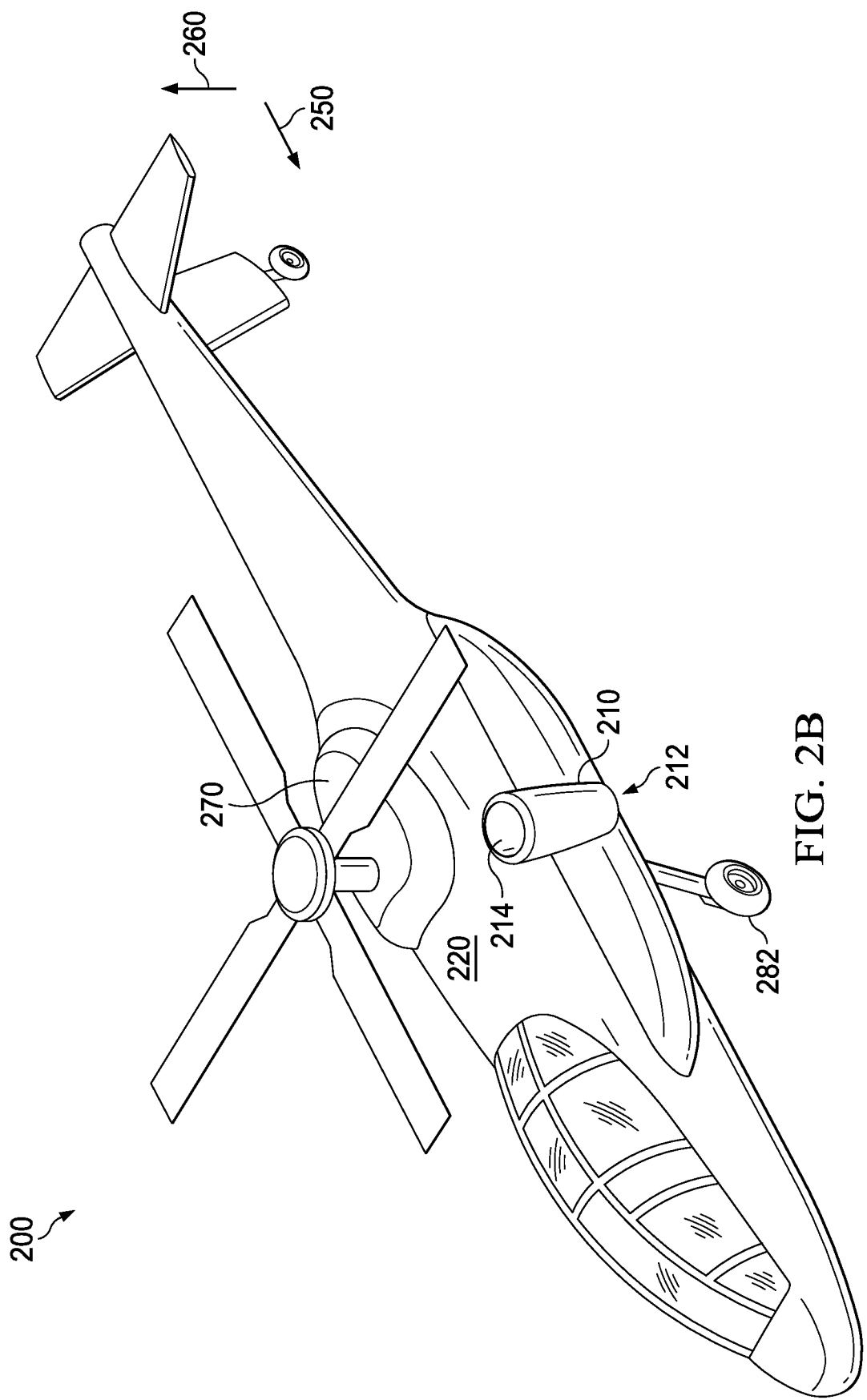
FIG. 2B illustrates the rotary wing aircraft of FIG. 2A having the secondary engine arrangement in a second configuration.

As illustrated in FIG. 2B, the secondary power source 210 may include a thrust outlet 212 and an air inlet 214. The secondary power source 216 may be repositioned (e.g., tilted, rotated) from a position as illustrated in FIG. 1A to the position illustrated in FIG. 2B. For example, FIG. 2A illustrates that the thrust outlet 212 may be positioned (e.g., tilted, rotated) such that air, e.g., exhaust, emitted from the thrust outlet 212 may be substantially parallel (e.g., substantially in an opposing direction) with a forward direction 250 of the helicopter 200. FIG. 2B illustrates that the thrust outlet may be positioned (e.g., tilted, rotated) such that air, e.g., exhaust, emitted from the thrust outlet 212, may be in a substantially perpendicular direction 260 to the forward direction 250 of the helicopter 200. The configuration of the thrust outlet 212 illustrated in FIG. 2A provides extra thrust when the helicopter is moving forward, e.g., parallel to the ground. The configuration of the thrust outlet 212 illustrated in FIG. 2B provides vertical thrust (e.g., downward jet-engine thrust) coplanar to the primary thrust force of the rotary wing blades 120, hence aiding the lifting efforts.

The secondary power source 210 may rotate about an axis in response to controls from a pilot or from a processor configured to coordinate the secondary power source with a primary power source.

With reference to FIG. 2B, the aircraft 200 may include retractable landing gear 282. The retractable landing gear 282 may be stowed in the fuselage 220 to reduce drag during forward flight.

Figure 3A:
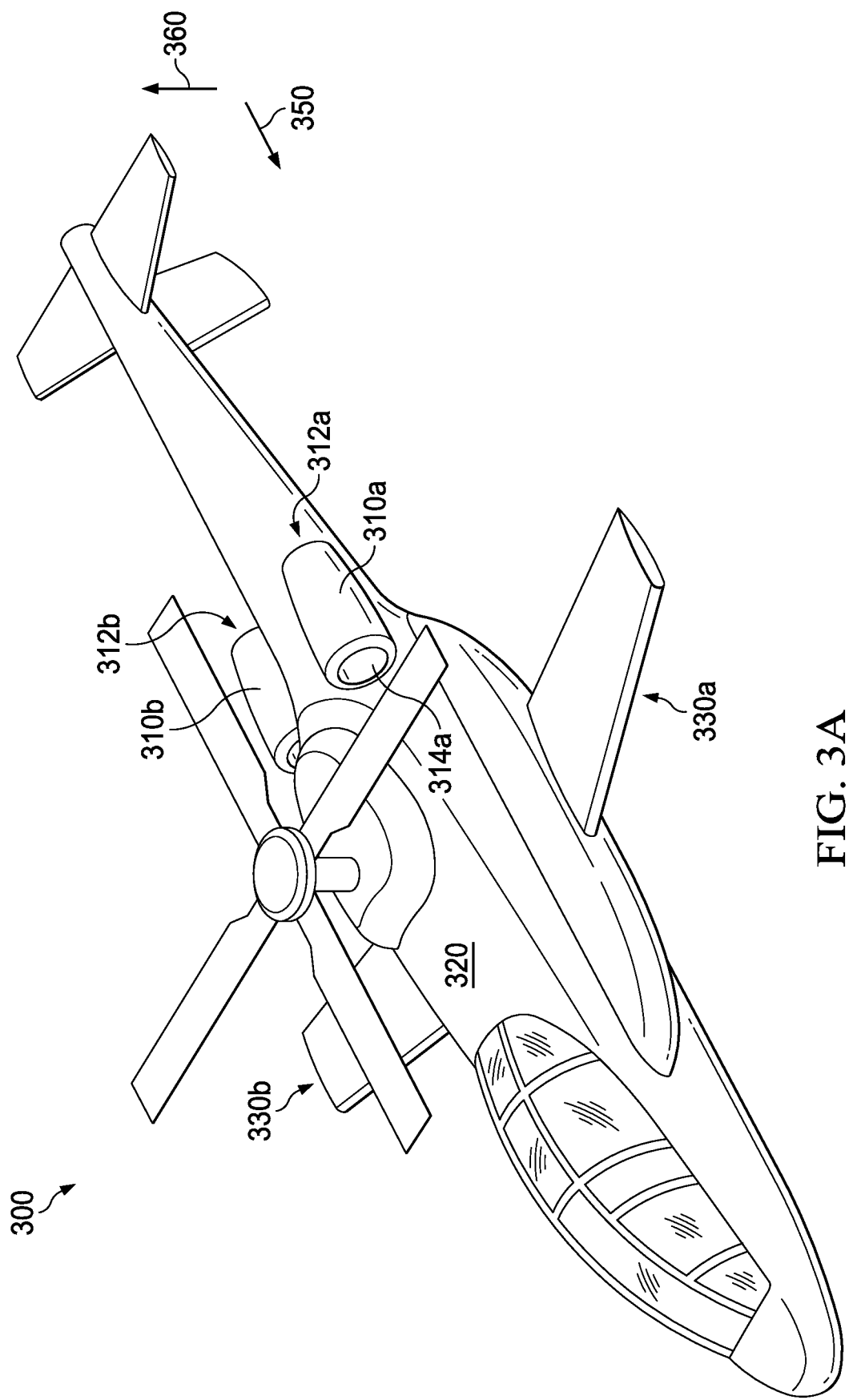
FIG. 3A illustrates a further implementation of a rotary wing aircraft having a secondary engine arrangement in a first configuration.

FIG. 3A illustrates another implementation of an aircraft 300. Similarly, illustrated features from the previous implementation are applicable to the present implementation and will not be discussed here.

The aircraft 300 may be a compound helicopter, using the Coandă effect, thereby not needing a tail rotor. The aircraft 300 may include secondary power sources 310*a* and 310*b* (e.g., a secondary power source, jet engine, (e.g., turbofan jet)). The secondary power sources 310*a* and 310*b* may be fixed to a fuselage 320 of the aircraft 300. The secondary power sources 310*a* and 310*b* may be fixed at any position on the aircraft 300. Fixed wings 330*a* and 330*b* may be included on opposing sides of the fuselage 320 of the helicopter. The fixed wings 330*a* and 330*b* may be fixed to the fuselage 320 so that they do not move relative to the fuselage 320.

There may be at least two secondary power sources fixed to the aircraft 300, e.g., the pair of secondary power sources 310a and 310b. The pair of secondary power sources may be fixed to the aircraft 300 on opposing sides of the aircraft 300. The pair of secondary power sources may be a power source arrangement.

The secondary power source 310a (e.g., both of the pair of secondary power sources 310a and 310b in a power source arrangement) may be a jet engine. For example, the jet engine may be a turbofan jet.

Figure 3B:
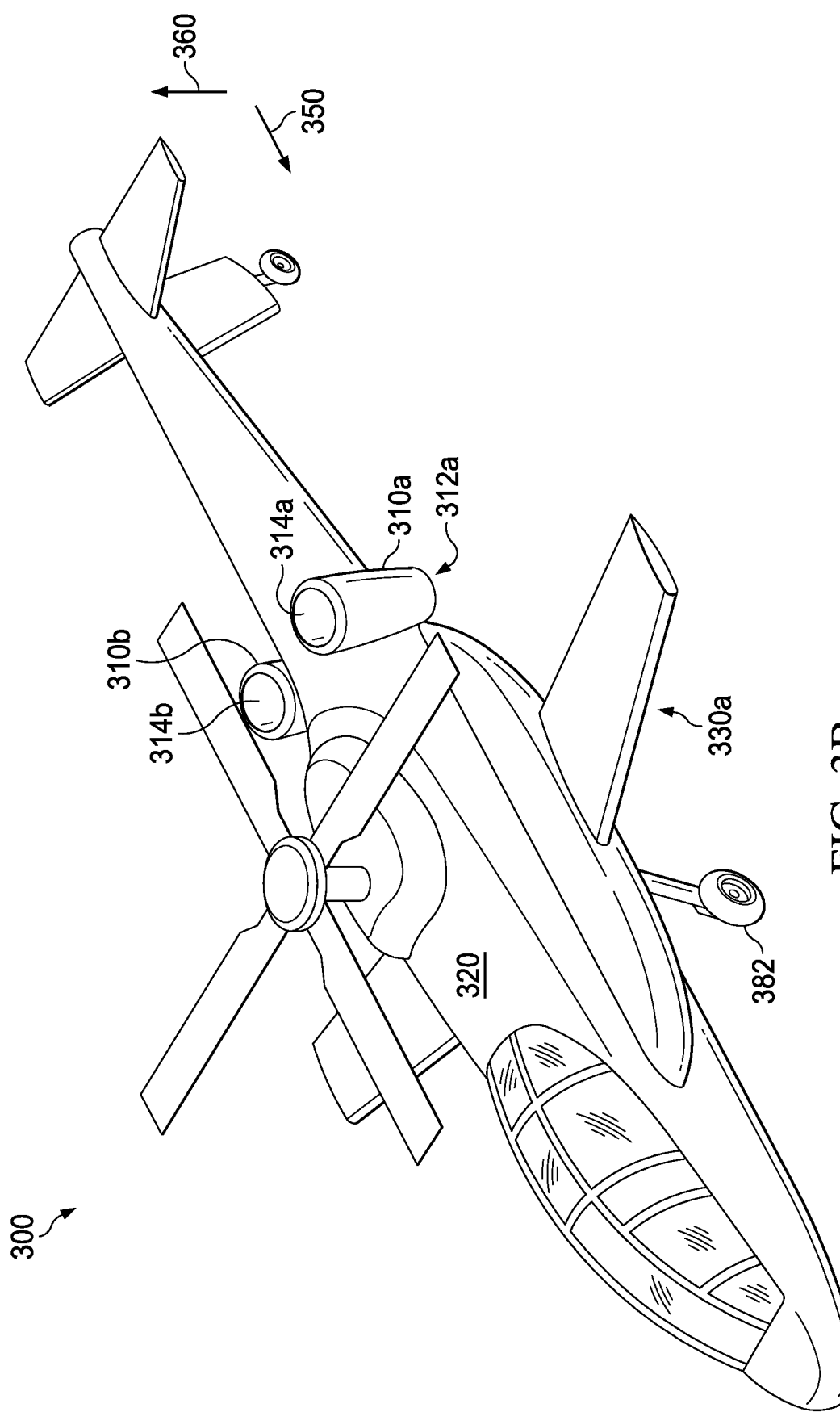
FIG. 3B illustrates the rotary wing aircraft of FIG. 3A having the secondary engine arrangement in a second configuration.

With reference to FIG. 3B, the aircraft 300 may include retractable landing gear 382. The retractable landing gear 382 may be stowed in the fuselage 320 to reduce drag during forward flight.

As illustrated in FIG. 3B, the secondary power source 310a may include a thrust outlet 312a and an air inlet 314a. The secondary power source 310b may also include a thrust outlet 312b and an air inlet (not shown). The secondary power sources 310a and 310b may be repositioned (e.g., tilted, rotated) from a position as illustrated in FIG. 3A to the position illustrated in FIG. 3B. For example, FIG. 3A illustrates that the secondary power sources 310a and 310b may be positioned (e.g., tilted, rotated) such that air, e.g., exhaust, emitted from the thrust outlet 312a may be substantially parallel (e.g., substantially in an opposing direction) with a forward direction 350 of the helicopter 300. FIG. 3B illustrates that the thrust outlet 312a may be positioned (e.g., tilted, rotated) such that air, e.g., exhaust, emitted from the thrust outlet 312 may be in a substantially perpendicular direction 360 to the forward direction 350 of the helicopter 300. The configuration of the thrust outlets 312a, 312b illustrated in FIG. 3A provides extra thrust when the helicopter is moving forward, e.g., parallel to the ground. The configuration of the thrust outlets 312a and 312b illustrated in FIG. 3B provides vertical thrust to aid the lifting efforts of the rotary wing blades 120.

Repositioning the secondary power sources 310a, 310b may be provided by rotating or tilting the secondary power sources 310a, 310b about an axis in response to from controls from a pilot or from a processor configured to coordinate the secondary power source with a primary power source. The rotation or tilt may be about a center of gravity of the secondary power sources 310a, 310b or near a center of gravity of the secondary power sources 310a, 310b.

Figure 4A:
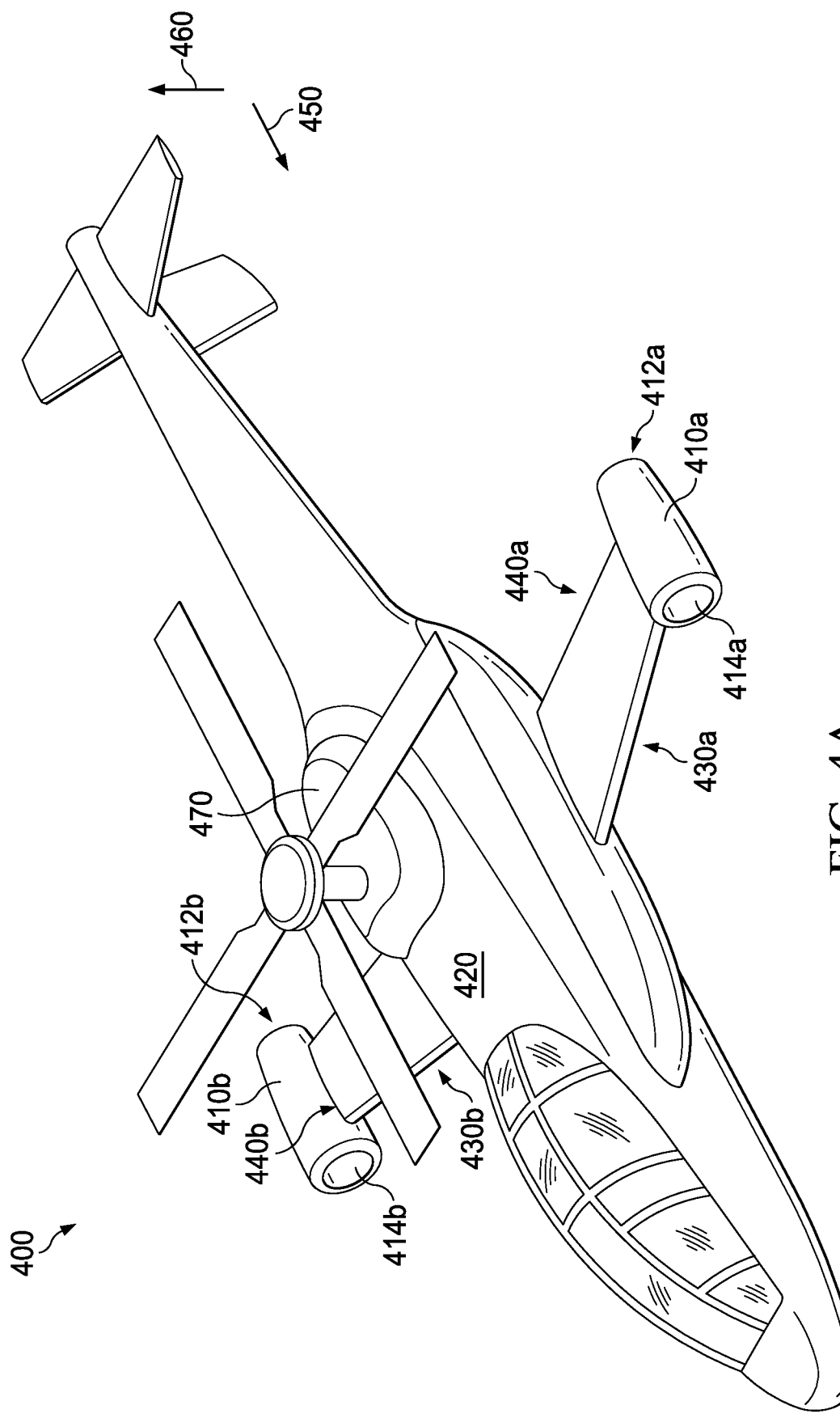
FIG. 4A illustrates a further implementation of a rotary wing aircraft having a secondary engine arrangement in a first configuration.

FIG. 4A illustrates another implementation of an aircraft 400. Similarly, illustrated features from the previous implementation are applicable to the present implementation and will not be discussed here.

The aircraft 400 may be a compound helicopter, using the Coandă effect, thereby not needing a tail rotor. The aircraft 400 may include a secondary power source 410a and 410b. Fixed wings 430a and 430b may be included on opposing sides of the fuselage 420 of the helicopter. The fixed wings 430a and 430b may be fixed to the fuselage 420 so that they are not required to move relative to the fuselage 420 to provide lift to the aircraft 400. The fixed wings 430a and 430b may move, fold, bend, tilt, rotate, etc. relative to the fuselage. However, any movement, folding, bending, tilting, rotating, etc. of the fixed wings 430a and 430b is unnecessary to provide lift to the aircraft 400.

There may be at least two secondary power sources fixed to the aircraft 400, e.g., a pair of secondary power sources 410a and 410b. The pair of secondary power sources 410a and 410b may be connected to distal ends 440a and 440b of the fixed wings 430a and 430b of the aircraft 400 on opposing sides of the aircraft 400. The pair of secondary power sources 430a and 430b may be a power source arrangement.

The secondary power sources 410a and 410b may each be a jet engine. For example, the jet engine may be a turbofan jet.

Figure 4B:
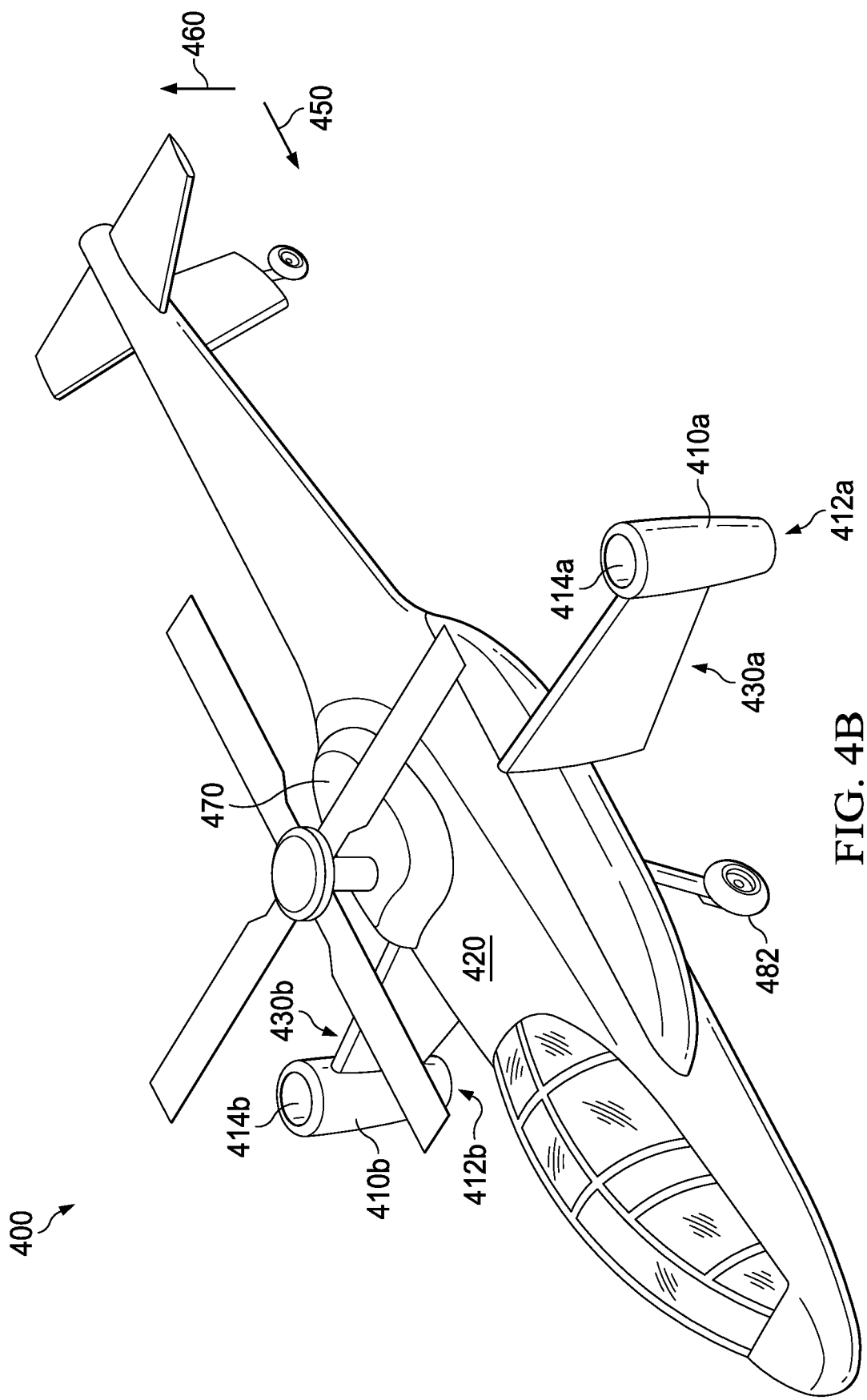
FIG. 4B illustrates the rotary wing aircraft of FIG. 4A having the secondary engine arrangement in a second configuration.

With reference to FIG. 4B, the aircraft 400 may include retractable landing gear 482. The retractable landing gear 482 may be stowed in the fuselage 420 to reduce drag during forward flight.

As illustrated in FIG. 4B, the secondary power source 410a may include a thrust outlet 412a and an air inlet 414a. The secondary power source 410b may also include a thrust outlet 412b and an air inlet (not shown). The secondary power sources 410a and 410b may be repositioned (e.g., tilted, rotated) from a position as illustrated in FIG. 4A to the position illustrated in FIG. 4B. For example, FIG. 4A illustrates that the secondary power sources 410a and 410b may be positioned (e.g., tilted, rotated) such that air, e.g., exhaust, emitted from the thrust outlet 412 may be substantially parallel (e.g., substantially in an opposing direction) with a forward motion 450 of the helicopter 400. FIG. 4B illustrates that the thrust outlets 412a, 412b may be positioned (e.g., tilted, rotated) such that air, e.g., exhaust, emitted from thrust outlets 412a, 412b may be perpendicular to a forward motion 450 of the helicopter 400, e.g., perpendicular motion 460. The configuration of the thrust outlets 412a, 412b illustrated in FIG. 4A provide extra thrust when the helicopter is moving forward, e.g., parallel to the ground. The configuration of the thrust outlets 412a, 412b illustrated in FIG. 4B provides vertical thrust to aid the lifting efforts of the rotary wing blades 120.

Repositioning the secondary power sources 410a and 410b may be provided by rotating or tilting the fixed wings 430a and 430b about an axis in response to controls from a pilot or from a processor configured to coordinate the secondary power source with a primary power source. The rotation or tilt may be about a center of gravity of the secondary power sources 410a and 410b or near a center of gravity of the secondary power sources 410a 410b or of an axis of rotation of the fixed wings 430a and 430b.

Figure 5A:
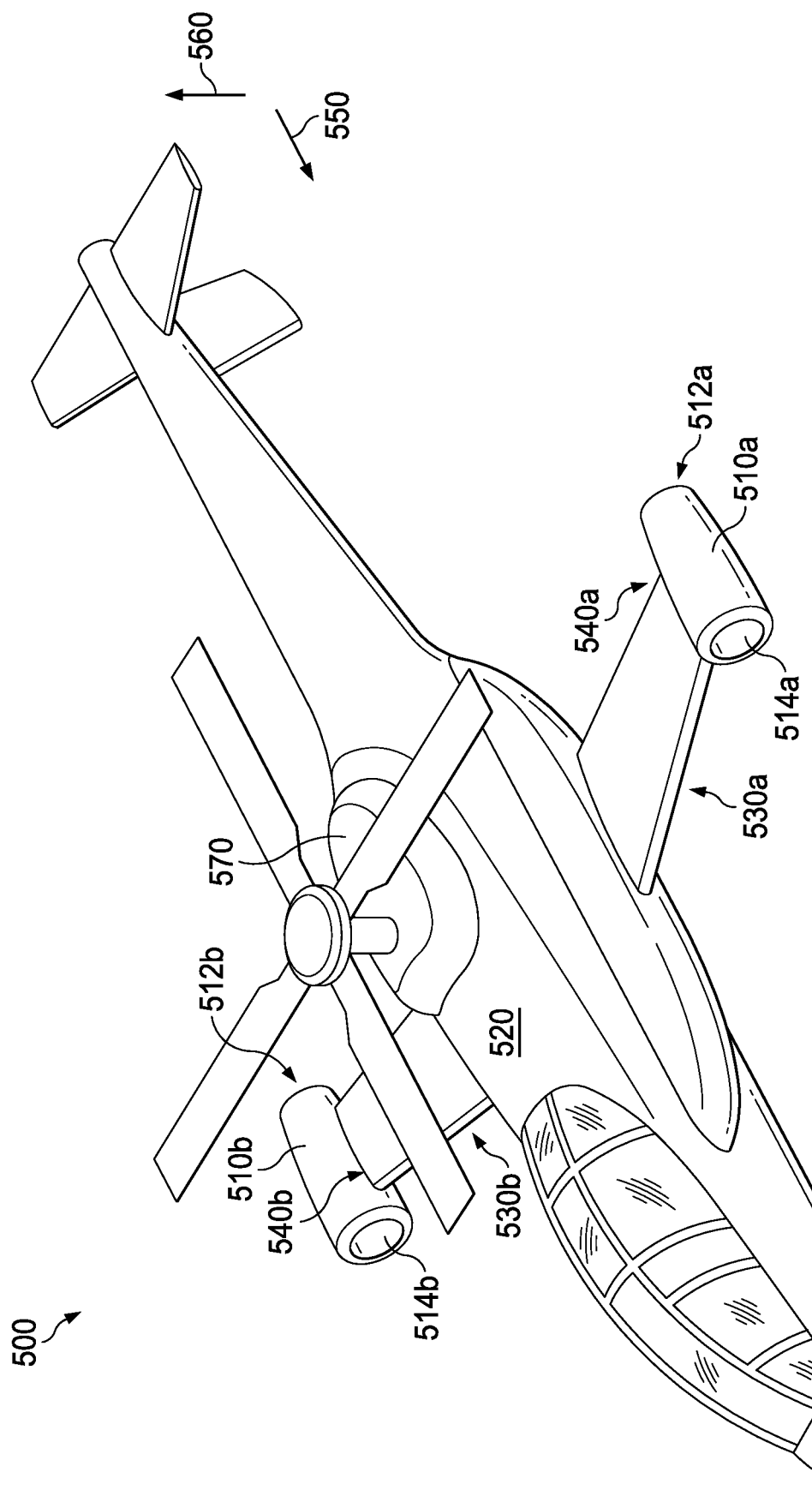
FIG. 5A illustrates a further implementation of a rotary wing aircraft having a secondary engine arrangement in a first configuration.

FIG. 5A illustrates another implementation of an aircraft 500. Similarly, illustrated features from the previous implementation are applicable to the present implementation and will not be discussed here.

The aircraft 500 may be a compound helicopter, using the Coandă effect, thereby not needing a tail rotor. The aircraft 500 may include a secondary power source 510a and 510b. Fixed wings 530a and 530b may be included on opposing sides of the fuselage 520 of the helicopter. The fixed wings 530a and 530b may be fixed to the fuselage 520 so that they are not required to move relative to the fuselage 520 to provide lift to the aircraft 500. The fixed wings 530a and 530b may move, fold, bend, tilt, rotate, etc. relative to the fuselage. However, any movement, folding, bending, tilting, rotating, etc. of the fixed wings 530a and 530b is unnecessary to provide lift to the aircraft 500.

There may be at least two secondary power sources fixed to the aircraft 500, e.g., a pair of secondary power sources 510a and 510b. The pair of secondary power sources 510a and 510b may be connected distal ends 540a and 540b of the fixed wings 530a and 530b of the aircraft 500 on opposing sides of the aircraft 500. The pair of secondary power sources 530a and 530b may be a power source arrangement.

The secondary power sources 510a and 510b may be a jet engine. For example, the jet engine may be a turbofan jet.

Figure 5B:
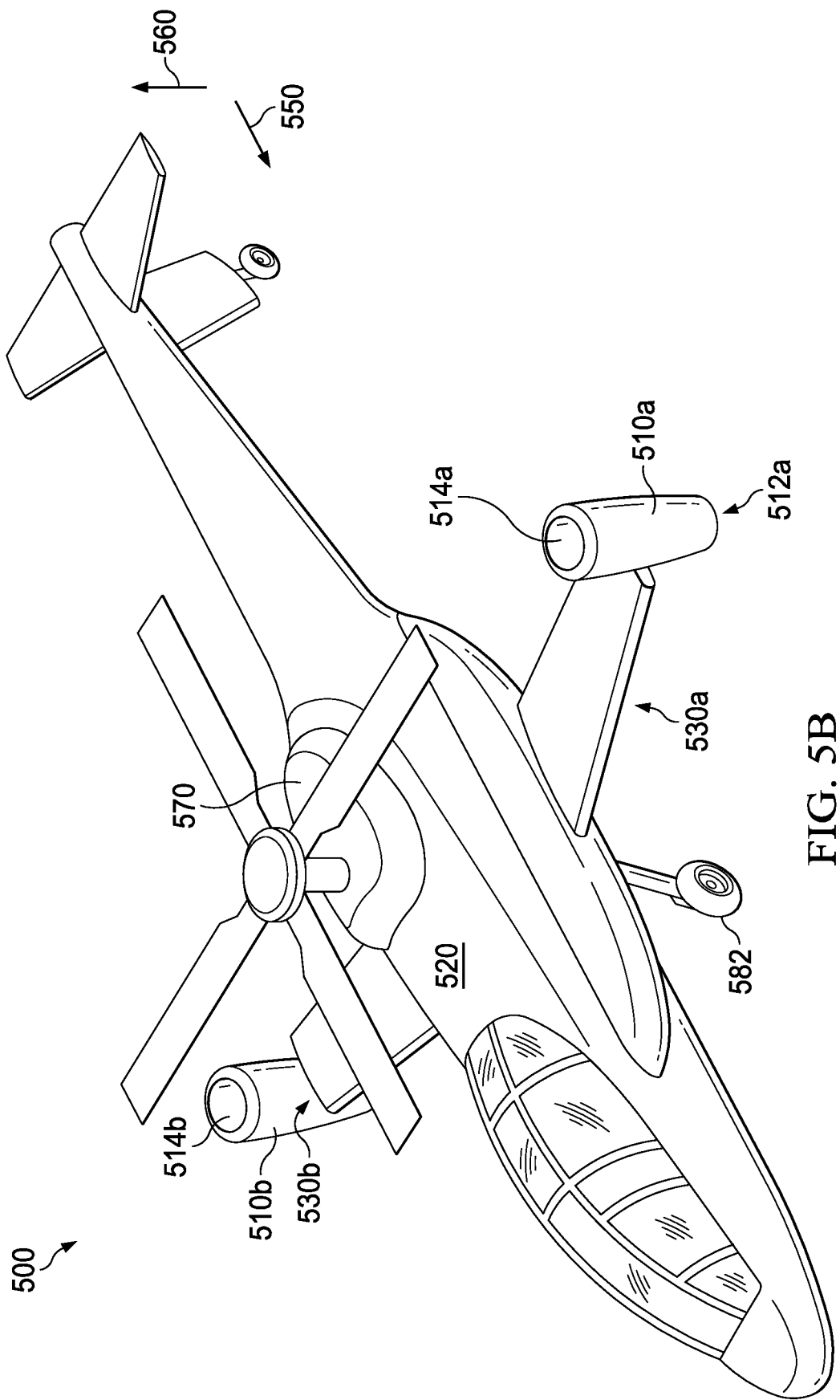
FIG. 5B illustrates the rotary wing aircraft of FIG. 5A having the secondary engine arrangement in a second configuration.

With reference to FIG. 5B, the aircraft 500 may include retractable landing gear 582. The retractable landing gear 582 may be stowed in the fuselage 520 to reduce drag during forward flight.

As illustrated in FIG. 5B, the secondary power source 510a may include a thrust outlet 512a and an air inlet 514a. The secondary power source 510b may also include a thrust outlet 512b and an air inlet 514b. The secondary power sources 510a and 510b may be repositioned (e.g., tilted, rotated) from a position as illustrated in FIG. 5A to the position illustrated in FIG. 5B. For example, FIG. 5A illustrates that the secondary power sources 510a and 510b may be positioned (e.g., tilted, rotated) such that air, e.g., exhaust, emitted from the thrust outlet 512 may be substantially parallel (e.g., substantially in an opposing direction) with a forward motion 550 of the helicopter 500. FIG. 5B illustrates that the thrust outlets 512a, 512b may be positioned (e.g., tilted, rotated) such that air, e.g., exhaust, emitted from the thrust outlets 512a, 412b may be substantially perpendicular to a forward motion 550 of the helicopter 500, e.g., perpendicular motion 560. The configuration of the thrust outlets 512a, 512b illustrated in FIG. 5A provides extra thrust when the helicopter is moving forward, e.g., parallel to the ground. The configuration of the thrust outlets 512a, 512b illustrated in FIG. 5B provides vertical thrust to aid the lifting efforts of the rotary wing blades 120.

Repositioning the secondary power sources 510a and 510b may be provided by rotating or tilting the secondary power sources 510a and 510b about an axis in response to controls from a pilot or from a processor configured to coordinate the secondary power source with a primary power. The rotation or tilt may be about a center of gravity of the secondary power sources 510a and 510b or near a center of gravity of the secondary power sources 510a and 510b.

With reference to FIGS. 1A and 1B as an example implementation, torque from the main rotor assembly 140 may be counterbalanced by the tail rotor assembly 135. Torque may also, or alternatively, be counterbalanced by adjusting thrust from the pair of secondary power sources. For example, thrust from one of the pair of secondary power sources may be actuated to counter torque from the main rotor assembly 140, thrust from another of the pair of secondary power source may be actuated to counter torque from the main rotor assembly or thrust from both of the pair of secondary power sources may be actuated to counter torque from the main rotor assembly.

As noted above, with respect to FIGS. 1A and 1B as an example implementation, a transitional thrust force may be provided by the secondary power source 150. A transitional thrust force may be provided in a direction at any point between a thrust force propelling the helicopter 100 in the forward direction 142 and a thrust force propelling the helicopter 100 in the perpendicular direction 144, e.g., vertical. A thrust force 146 from the secondary power source may have two components—an X-component, e.g., in a rearward direction, e.g., opposite the forward direction 142, and a Y-component, e.g., in a downward direction opposite of the perpendicular direction 144, where X—is parallel to the force of thrust and Y—is perpendicular to the force of thrust shown in FIG. 1A.

The thrust force 146 may assist in counteracting torque produced by the main rotor assembly 140. For example, the X-component of the thrust force from each secondary power source may provide an opposite rotational force on the helicopter from the rotational force imparted on the helicopter by the main rotor assembly 140. The amount of thrust from the pair of secondary power sources may each be adjusted responsive to the torque so that the X-component of the force of thrust balances the torque from the main rotor assembly 140. Therefore, individual X-components from each engine are not necessarily equal between the engines but are allowed to differ from each other to balance the torque from the main rotor assembly 140.

The thrust force 146 may assist in affecting roll of the helicopter 100. For example, the Y-component of the thrust force from each secondary power source may provide a downward thrust to keep the helicopter level. The amount of thrust from the pair of secondary power sources may be adjusted so that the Y-component of the force of thrust maintains the helicopter in a level attitude.

A side valve 148 may be included in each of the secondary power sources so that a lateral force is provided to assist in counteracting the torque from the main rotor assembly 140. For example, exhaust from the outlet 152 may be bled from the secondary power source 150 and redirected toward side valve 148. In this respect, the secondary power source 150 may be committed to affecting roll of the helicopter 100 while the side valves counteract torque. The side valves may also be used to fine-tune the torque balancing efforts of the secondary power source.

An anterior valve 149 (illustrated symbolically) may be included in each of the secondary power sources so that a lateral force is provided to assist in affecting roll. For example, exhaust from the outlet 152 may be bled from the secondary power source 150 and redirected toward anterior valve 149. In this respect, the secondary power source 150 may be committed to counteracting torque from the main rotor assembly 140 while the anterior valves 149 affect roll. The anterior valves 149 may also be used to fine-tune the roll balancing efforts of the secondary power source.

Figure 6:
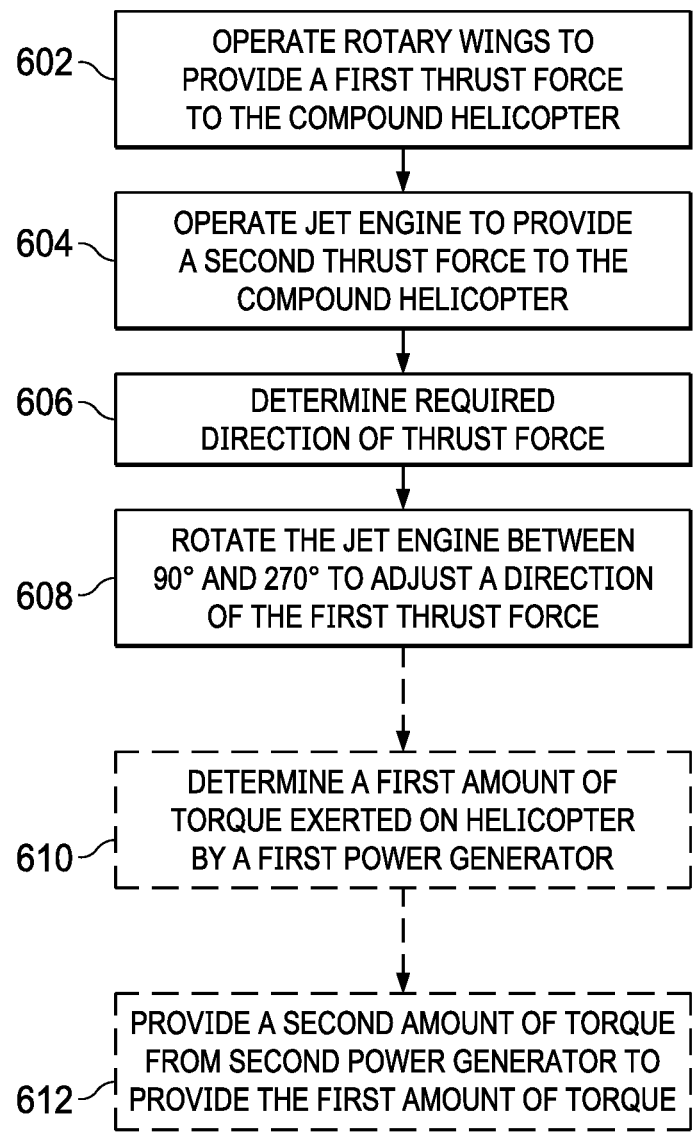
FIG. 6. Illustrates a method of providing thrust to a compound helicopter.

With exemplary reference to the elements illustrated FIGS. 1A-1B, FIG. 6 illustrates an implementation of a method of providing thrust to a compound helicopter 100. At step 602, the first power generator 170 may provide a rotational to a rotary wing 140. At step 604, the secondary power source 150, e.g., the turbofan jet, may be operated to provide a second thrust force to the compound helicopter 100. At step 606, a direction of thrust from the secondary power source 150 may be determined, e.g., rearward thrust, upward thrust, and forward thrust. At step 608, the secondary power source may be positioned, e.g., rotated/tilted, between 90 and 270 degrees from its current direction.

In a further implementation, step 610 may optionally be included in which a first amount of torque exerted on the compound helicopter 100 by the first power generator 170 may be determined. At optional step 612, a second amount of torque may be provided by the second power generator arrangement. For example, a substantially equal and opposite torque may be provided to counteract, e.g., negate, the first amount of torque.

Reference is made in the foregoing detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others.

Example implementations are provided so that this disclosure will be thorough, and will fully convey the scope to those who are skilled in the art. Numerous specific details are set forth such as examples of specific components, devices, and methods, to provide a thorough understanding of implementations of the present disclosure. It will be apparent to those skilled in the art that specific details need not be employed, that example implementations may be embodied in many different forms and that neither should be construed to limit the scope of the disclosure. In some example implementations, well-known processes, well-known device structures, and well-known technologies are not described in detail.

The terminology used herein is for the purpose of describing particular example implementations only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example implementations.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Further, it is to be understood that other implementations may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict the scope of claimed subject matter. Therefore, the foregoing detailed description is not to be taken to limit claimed subject matter and/or equivalents.

Although illustrative implementations of claimed subject matter have been described in detail herein with reference to the accompanying drawings, it is to be understood that the invention is not limited to those precise implementations, and that various changes, additions and modifications can be effected therein by one skilled in the art without departing from the scope of the invention as defined by the appended claims. For example, various combinations of the features of the dependent claims could be made with the features of the independent claims without departing from the scope of claimed subject matter.

What is claimed is:

1. A compound helicopter, comprising:
   at least one rotary wing system configured to provide a primary thrust force in a first direction to the helicopter;
   a first power generator within the helicopter, configured to rotate at least one rotary wing of the rotary wing system;
   at least one second power generator connected to the helicopter;
   a fuselage; and
   at least one secondary wing connected to the fuselage and having:
     a proximal end region connecting the at least one secondary wing to the fuselage; and
     a distal end region opposite the proximal end region, wherein the at least one second power generator is attached to the distal end region.

2. The compound helicopter as recited in claim 1, wherein the at least one second power generator is a turbofan jet engine.

3. The compound helicopter as recited in claim 1, wherein the at least one second power generator is configured to tilt.

4. The compound helicopter as recited in claim 1, wherein the at least one second power generator is configured to generate thrust:
   in a second direction that is independent of the first direction;
   in a third direction that is substantially parallel to the first direction; and
   in a fourth direction.

5. The compound helicopter as recited in claim 1, further comprising:
   a tail boom aft of the at least one rotary wing system, extending from the compound helicopter and having a proximal end region at the compound helicopter and a distal end region aft of the proximal end region; and
   a tail rotor at the distal end region of the tail boom.

6. The compound helicopter as recited in claim 1, wherein the at least one second power generator comprises a flexible tube.

7. The compound helicopter as recited in claim 6, wherein the flexible tube is configured to provide thrust in one or more directions.

8. A compound helicopter, comprising:
at least one rotary wing system configured to provide a primary thrust force in a first direction to the helicopter;
a first power generator within the helicopter, configured to rotate at least one rotary wing of the rotary wing system;
a fuselage;
at least one secondary wing connected to the fuselage and having,
a proximal end region connecting the at least one secondary wing to the fuselage; and
a distal end region opposite the proximal end region, wherein the at least one secondary wing is configured to tilt.

9. The compound helicopter as recited in claim 8, wherein the at least one second power generator is configured to tilt.

10. A compound helicopter, comprising:
a fuselage;
an empennage connected to the fuselage;
one or more wings, connected to the fuselage;
a main rotor assembly having a first power generator configured to rotate at least one rotary wing and generate thrust in a first direction; and
one or more second power generators coupled to at least one of the fuselage, the empennage, or the one or more wings and configured to generate thrust in the first direction, wherein each of the one or more second power generators comprises a flexible tube.

11. The compound helicopter as recited in claim 10, wherein the at least one second power generator is a turbofan jet engine.

12. The compound helicopter as recited in claim 11, wherein the one or more wings have
a proximal end region connecting the one or more wings to the fuselage; and
a distal end region opposite the proximal end region.

13. The compound helicopter as recited in claim 12, wherein the one or more second power generators are attached to the distal end region.

14. The compound helicopter as recited in claim 13, wherein the one or more wings are configured to tilt.

15. The compound helicopter as recited in claim 10, wherein the one or more second power generators are configured to tilt.

16. The compound helicopter as recited in claim 10, wherein the one or more second power generators are configured to tilt.

17. The compound helicopter as recited in claim 10, wherein the flexible tube is configured to generate thrust in one or more directions.

18. The compound helicopter as recited in claim 10, wherein the flexible tube comprises a combined tube.

19. The compound helicopter as recited in claim 10, further comprising:
a tail boom aft of the main rotor, having a proximal end region at the compound helicopter and a distal end region aft of the proximal end region; and
a tail rotor at the distal end region of the tail boom.

* * * * *

UNITED STATES PATENT AND TRADEMARK OFFICE
CERTIFICATE OF CORRECTION

PATENT NO. : 11,414,183 B2  
APPLICATION NO. : 16/541068  
DATED : August 16, 2022  
INVENTOR(S) : Jouyoung Jason Choi and Carlos Alexander Fenny Page 1 of 1

It is certified that error appears in the above-identified patent and that said Letters Patent is hereby corrected as shown below:

On the Title Page

Item (72) Inventors:  
Jouyoung Jason Choi, Southlake, TX (US); Carlos Alexandra Fenny, Fort Worth, TX (US)

Should read:  
Jouyoung Jason Choi, Southlake, TX (US); Carlos Alexander Fenny, Fort Worth, TX (US)

Signed and Sealed this  
Thirtieth Day of December, 2025

John A. Squires  
*Director of the United States Patent and Trademark Office*